April 2, 1957  B. M. GOLDSMITH  2,787,767
FILTER STRUCTURE
Filed May 5, 1954

INVENTOR.
BERNARD M. GOLDSMITH
BY
Harry M. Saragovitz
ATTORNEY

United States Patent Office 2,787,767
Patented Apr. 2, 1957

2,787,767

FILTER STRUCTURE

Bernard M. Goldsmith, Westfield, N. J., assignor to the United States of America as represented by the Secretary of the Army Application May 5, 1954, Serial No. 427,894

5 Claims. (Cl. 333—79)

This invention relates to filter networks and more particularly to a unitary structure designed to operate effectively as a low pass filter.

Ordinarily, the practice in the filter art is to utilize the various necessary individual components such as capacitors and inductors to provide a desired filter network. For example, in a low pass pi-filter, there are included a series connected inductor shunted by a capacitor at both its input and output ends. In such a filter, the need for three individual components, in addition to necessitating the complexity of manufacture of the separate devices and their assembly, also encounters the problems of shielding, space consumption, the requirement of numerous electrical leads, and their difficulty of mounting on the apparatus chassis. Also, in the low pass type pi-filter, the presence of inductance in the capacitor leads results in the lowering of the effective frequency cut-off point.

It is, accordingly, the primary object of the present invention to provide a unitary structure which effectively operates as a low pass pi-filter.

It is a further object to provide a low pass pi-filter network requiring no capacitor leads.

It is another object to provide a shielded unitary structure low pass pi-filter.

In accordance with the present invention, there is provided a unitary filter structure comprising a tube consisting of a dielectric material, a first metal coating on the outer surface of the tube, second metal coatings on the end portions of the inner surface of the tube whereby effective capacitors are provided at the end portions thereof, an inductance element within said tube and means at each end of said tube for connecting the respective ends of said inductance element with each of said capacitors.

For a better understanding of the invention, together with other and further objects thereof, reference is had to the following description taken in connection with the accompanying drawings and its scope will be pointed out in the appended claims.

Figure 1:
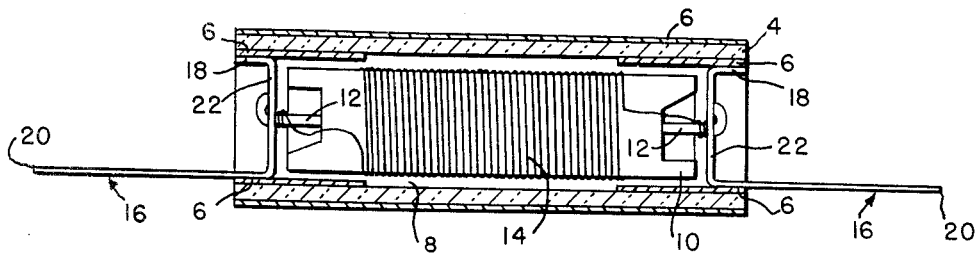
Figure 2:
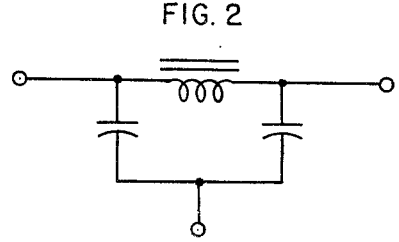

In the drawings Fig. 1 is a view partly in cross section of a preferred embodiment of the present invention and Fig. 2 is a schematic depiction of the equivalent circuit of the device of Fig. 1.

Referring now more particularly to Fig. 1, a tube 4 consisting of a high dielectric material such as ceramic and the like is totally coated with silver 6 or other suitable metal on its outer surface. A like coating 6 extends axially from each end of the tube along its inner surface for a predetermined distance thereby providing an inner bore 8 of tube 4 which is surrounded by two coated end portions and a non coated portion therebetween. Freely disposed within bore 8 substantially intermediate the coated end portions of tube 4 is an iron core 10 or other ferromagnetic element having a high permeability such as carbonyl-iron powder material. Affixed to each end of core 10 is an electrical lead 12 such as a tinned copper wire. For convenience, core 10 may be provided with configured trough like depressions at each end to accommodate leads 12. Around core 10 is a solenoid winding 14 of suitable electric wire, each end of the winding terminating around respective leads 12. Soldered to the inner coated surfaces of the tube are terminal lugs 16. In the present embodiment, lugs 16 are substantially J shaped, the short legs 18 of the lugs being soldered along their length at one portion of the inner coated surface, the end of the short leg being flush with the end of tube and the long legs 20 being soldered to respective diametrically opposed portions of the inner surface. Leads 12 are hooked over the terminal portions 22 of lugs 16 connecting the two legs thereof and are soldered thereto substantially as shown. The long legs 20 of respective terminal lugs 16 now may serve as input and output leads respectively, and the device may be suitably grounded by a lead (not shown) from the outer metalled surface of tube 4.

Fig. 2 is a schematic depiction of the effective equivalent circuit of the invention. The capacitors of the circuit are provided by the dielectric tube material sandwiched between the inner and outer metal tube coverings at each end of tube and the inductance is provided by the solenoid wound iron core within the tube. The invention, therefore, provides a low pass pi-filter by means of a unitary structure. It, thus, eliminates the need for the several components required in a filter network, and it eliminates the capacitor leads avoiding the deleterious effects of the inductance in these leads thereby preventing a lowering of the frequency cut-off point. In addition the silver coating on the outer surface functions as a shield so that the requirement of a separate shield such as a can is eliminated.

While there has been described what is believed to be the preferred embodiment of the present invention, it will be understood by those skilled in the art that various changes and modifications may be made therein without departing from the invention and it is therefore aimed in the hereinafter appended claims to cover all such modifications and changes as fall within the spirit and scope of the invention.

What is claimed is:

1. A unitary low pass filter structure comprising a tube consisting of dielectric material, a first metal coating on the outer surface of said tube, second metal coatings on the end portions of the inner surface of the tube whereby capacitors are provided at said end portions, an inductance element having a core positioned within said tube and means at each end of said tube for supporting said tube and for connecting the respective ends of said inductance element with each of said capacitors, each of said means comprising a substantially J shaped metallic member having a portion extending into an end of said tube and being attached to the second metal coating at said end at diametrically opposite portions thereof and a hook shaped metallic member, the hooked end being hooked over the said portion of said J-shaped member extending into said tube, the remaining end being attached to the end of said core adjacent said second metal coating.

2. A unitary low pass filter structure as in claim 1 wherein said dielectric material is ceramic.

3. A unitary low pass filter structure as in claim 1 wherein said metal coatings are silver.

4. A unitary low pass filter structure as in claim 1 wherein said inductance element is a ferromagnetic core having a solenoid winding therearound.

5. A unitary structure effectively utilizable as a shielded low pass pi-filter comprising a ceramic tube, a silver coating on the outer surface and the end portions of the inner surface of said tube whereby a capacitor is provided at each end of said tube, an inductance element consisting of an iron core having a solenoid wound wire therearound within said tube, and means at each end of said tube connected to a respective coated end portion of the tube and to an end of said inductance element whereby said capacitors and said inductance element are joined, said end means also serving to connect said structure in a utilizing circuit, said end means comprising a substantially J shaped member, the short leg of said J shaped member being attached along its length to a portion of the silver coating of said respective coated end portion, the long leg thereof being attached to a diametrically opposite portion of said silver coating, and a hook shaped metallic member, the hooked end of said metallic member being hooked over the terminal portion of said J-shaped member between said short and long legs, the remaining end of said hook shaped member being attached to the end of said iron core adjacent said terminal portion.

References Cited in the file of this patent
UNITED STATES PATENTS

| | | |
|---|---|---|
| 2,080,024 | Yoder et al. | May 11, 1937 |
| 2,626,318 | Torre | Jan. 20, 1953 |
| 2,759,155 | Hackenberg | Aug. 14, 1956 |